(12) United States Patent
Uenishi

(10) Patent No.: US 7,301,364 B2
(45) Date of Patent: Nov. 27, 2007

(54) OUTPUT BUFFER CIRCUIT AND SEMICONDUCTOR DEVICE

(75) Inventor: Yasutaka Uenishi, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 106 days.

(21) Appl. No.: 11/242,052

(22) Filed: Oct. 4, 2005

(65) Prior Publication Data

US 2006/0071688 A1    Apr. 6, 2006

(30) Foreign Application Priority Data

Oct. 5, 2004   (JP) .............................. 2004-292903

(51) Int. Cl.
*H03K 17/16* (2006.01)
(52) U.S. Cl. ......................... 326/27; 326/83
(58) Field of Classification Search ................ 326/26, 326/27, 82–87
See application file for complete search history.

(56) References Cited

U.S. PATENT DOCUMENTS 6,031,389 A * 2/2000 Fotouhi et al. ............... 326/31
6,094,086 A * 7/2000 Chow ........................ 327/396
6,236,239 B1 * 5/2001 Kogushi ....................... 326/88
6,606,271 B2 * 8/2003 Hunt ....................... 365/189.05

FOREIGN PATENT DOCUMENTS

JP          2002-94365         3/2002

* cited by examiner

Primary Examiner—Don Le
(74) Attorney, Agent, or Firm—McGinn IP Law Group, PLLC

(57) ABSTRACT

Disclosed is an output buffer circuit provided with a pre-emphasis function, including a first buffer circuit, receiving a first logic signal to drive a transmission line, and a second buffer circuit. The second buffer circuit includes an inverting buffer, receiving a second logic signal that is in a predetermined logical relationship with respect to the aforementioned first logic signal, and having outputs connected in common with an output of the aforementioned first buffer circuit, a first switch, connected across the inverting buffer and a first power supply, and controlled to be turned on or off based on a signal supplied to a control terminal, and a second switch, connected across the inverting buffer and a second power supply and controlled to be turned on or off based on a signal supplied to a control terminal in association operatively with the first switch. The output buffer circuit also includes first and second capacitors across an input end of the first buffer circuit and a connection node between the inverting buffer and the first switch and across the input end of the first buffer circuit and a connection node between the inverting buffer and the second switch.

10 Claims, 17 Drawing Sheets

FIG.4A
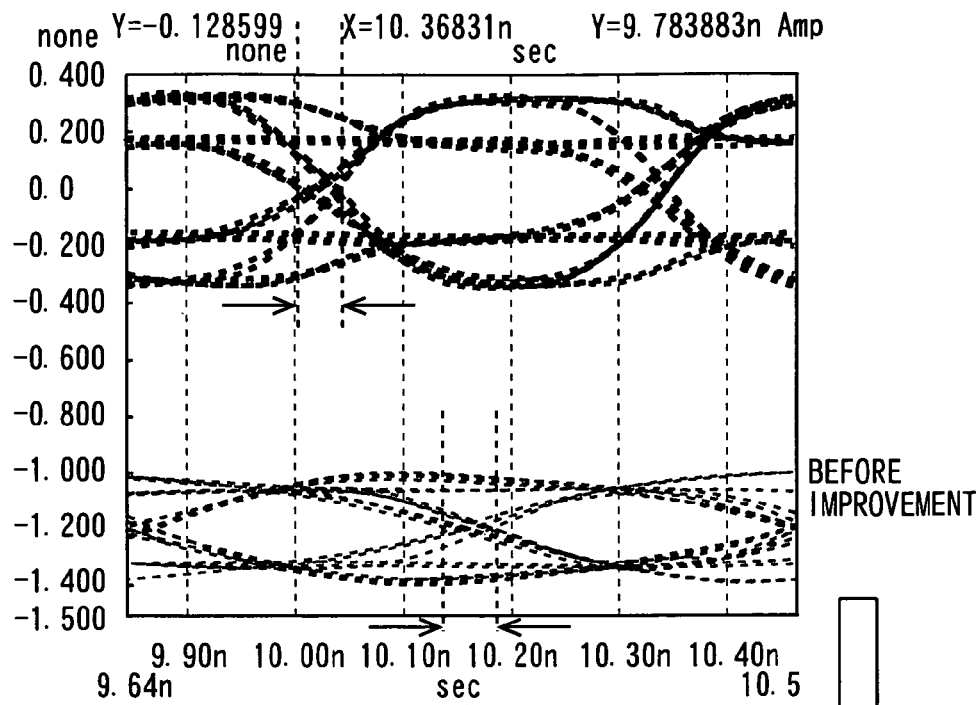
BEFORE IMPROVEMENT
FIG.4B
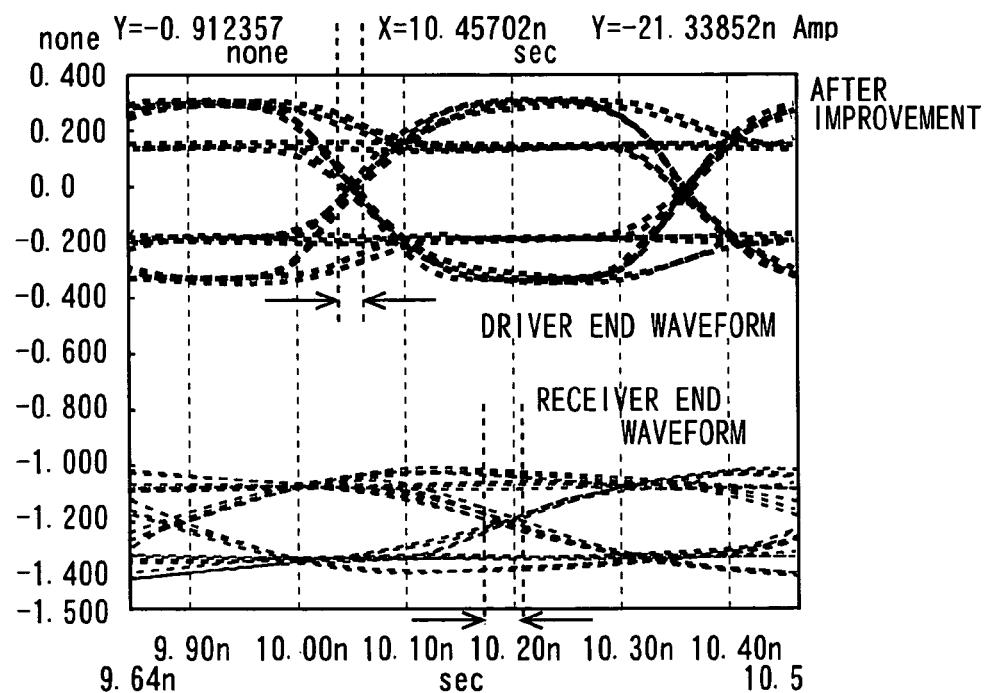
AFTER IMPROVEMENT
DRIVER END WAVEFORM
RECEIVER END WAVEFORM
FIG.4C
|  | CONVENTIONAL CIRCUIT | EMBODIMENT | EFFECT |
|---|---|---|---|
| JITTER (DRIVER END) | 37.87ps | 17.88ps | 52.78% |
| JITTER (RECEIVER END) | 49.84ps | 34.77ps | 30.2% |

CURRENT BIT SIGNAL S01

INVERTED PRE-BIT SIGNAL S02

OUTPUT SIGNAL SOUT

PRE-EMPHASIS NON-OPERATING STATE

PRE-EMPHASIS OPERATING STATE

EMPHASIS EFFECTIVE FOR ONLY ONE BIT

FOR EYE REPRESENTATION,
FOLD AND SUPERPOSE EVERY ONE BIT

ABSENCE OF PRE-EMPHASIS

JITTER INCREASE

PRESENCE OF PRE-EMPHASIS

US 7,301,364 B2

OUTPUT BUFFER CIRCUIT AND SEMICONDUCTOR DEVICE

FIELD OF THE INVENTION

This invention relates to an output buffer circuit of a semiconductor device and, more particularly, to an output buffer circuit having a pre-emphasis function.

BACKGROUND OF THE INVENTION

With the advent of the broadband technique and high-speed transmission rate in recent years, deterioration in the transmission waveform in serial signal transmission has become of a serious problem. The function of pre-emphasis is a technique of emphasizing the amplitude of a transmission signal at the time of transition thereof on a transmission side, in order to prevent pattern-dependent deterioration of the transmission signal, thereby improving a waveform of the signal on a receiving side. In the transmission at the rate on the order of GHz, in which the log of signal attenuation due to skin effect and dielectric losses per unit distance of a transmission line increases in proportion to the log of the frequency of signal, the application of pre-emphasis is crucial and indispensable.

With the pre-emphasis, the signal level during the time the pre-emphasis is operating differs from that during the time the pre-emphasis is not operating. Thus, with increase in the operating frequency, the difference in delay presents itself as jitter, such that the eye opening becomes does not satisfies ultimately the specification. It is therefore necessary to take appropriate measures to reduce jitter during the time of employing the pre-emphasis function.

As an output buffer circuit with a small propagation delay time, having a pre-emphasis function, which is operable at a lower voltage and which is suited for high speed operation, there is disclosed in Patent Document 1 a configuration shown herein in FIG. 9. The configuration shown in FIG. 9 includes a first buffer B1 and a second buffer B2. The first buffer B1 includes a first P-channel field effect transistor P1, which has a source electrode connected to a high potential power supply VDD, and a first N-channel field effect transistor N1 which has a source electrode connected to a low potential power supply VSS. The second buffer B2, includes a second P-channel field effect transistor P2, which has a source electrode connected to the high potential power supply VDD, and a second N-channel field effect transistor N2, which has a source electrode connected to the low potential power supply VSS. The driving power of the first P-channel field effect transistor P1 is set so as to be larger than that of the second N-channel field effect transistor N2, while the driving power of the first N-channel field effect transistor N1 is set so as to be larger than that of the second P-channel field effect transistor P2. In FIG. 9, L denotes a transmission line, the beginning end of which is connected to an output terminal TOUT of the buffer circuit and the terminal end of which is connected to a receiving terminal TRV on the receiving end. Rt denotes a termination resistor.

FIG. 11 shows instances of an input signal and an output signal for the output buffer circuit of FIG. 9. It may be seen that, in FIG. 9, a current bit signal SO1 of FIG. 11 is supplied to a terminal TA, whilst an inverted pre-bit signal SO2 is supplied to a terminal TB. The inverted pre-bit signal SO2 is obtained on inverting the current bit signal SO1 and on shifting the signal by one bit. When the signals SO1, SO2 are supplied to the terminals TA and TB, respectively, an output waveform, shown as an output signal SOUT in FIG. 11, is obtained at the output terminal TOUT of the output buffer circuit. If the bits of the signals SO1, SO2 are (1,1) or (0,0), the output signal SOUT is at a Voh1 level or Vol1 level, respectively, whereas, if the bits of the signals SO1, SO2 are (1,0) or (0,1), the output signal SOUT is at a Voh2 level or Vol2 level, respectively. Only when the current bit signal is changed from 0 to 1 or from 1 to 0, such change is emphasized in one bit period by the output signal SOUT, such that decrease in signal caused by loss on the transmission line is pre-emphasized on a driver side (output buffer side) to send out the signal. When the current bit signal is changed from 0 to 1, the transition from the level Vol2 to the level Vol1 (>Voh2) occurs, by way of pre-emphasis, whereas, when the current bit signal SO1 is changed from 1 to 0, the transition from the level Voh2 to the level Vol1 (<Vol2) occurs, by way of pre-emphasis.

FIG. 10 shows an alternative configuration, disclosed in Patent Document 1. In an output buffer B20 in this alternative configuration, in distinction from the configuration shown in FIG. 9, a P-channel field effect transistor P3 is connected across the source electrode of the P-channel field effect transistor P2 and the high potential power supply VDD, whilst an N-channel field effect transistor N3 is connected across the source electrode of the N-channel field effect transistor N2 and the low potential power supply VSS. A signal from a terminal TS is inverted by an inverter INV3 and thence supplied to the gate electrode of the P-channel field effect transistor P3, and a signal from the terminal TS is supplied to the gate electrode of the N-channel field effect transistor N3 to provide the output buffer B20 with a on/off switching control function.

[Patent Document 1]
  Japanese Patent Kokai Publication No. JP-P2002-94365A (FIGS. 1 and 4)

SUMMARY OF THE DISCLOSURE

As may readily be understood from FIG. 11, a pre-emphasis on state is necessarily set for a predetermined time period when a logic signal to be transmitted has been changed. However, directly before the logic signal is changed, the state of the pre-emphasis may be either a pre-emphasis on state, or a pre-emphasis off state. This difference, that is, whether the pre-emphasis directly before change in the logic signal is on or off, results in the difference in voltage of a start point directly before change in the logic signal, thus possibly producing the jitter. For example, if, when the output signal SOUT of FIG. 11 is changed from a low level to a high level, the pre-emphasis is off directly before such change, it is sufficient for the signal SOUT to start from Vol2, whereas, if the pre-emphasis is on directly before such change, the signal SOUT has to start from Vol1, meaning a handicapped start, thus naturally causing delay in the timing until rise of the signal SOUT. In similar manner, if, when the output signal SOUT is changed from a high level to a low level, the pre-emphasis is off directly before such change, it is sufficient for the signal SOUT to start from Voh2, whereas, if the pre-emphasis is on directly before such change, the signal SOUT has to start from Voh1, thus causing delay in the timing until fall of the signal SOUT.

Meanwhile, in the application in which high-speed transmission is carried out with the use of the pre-emphasis function, differential signal transmission, superior in resistance against noise, is generally adopted. For error-free high-speed transmission of this differential signal, an area enclosed by the positive and negative signals constituting the differential signal needs to be as broad as possible. This area is termed an eye opening or an eye pattern.

Referring to FIGS. 12 and 13, an eye opening and its specification are described. In FIG. 12, showing schematics of an eye pattern specification (a typical eye pattern specification), 1 bit=1 UI (unit Interval), a width Wa, a width Wb and an amplitude Ha are defined as shown.

FIG. 13 shows the relationship between the simulation waveform and the eye opening specification. If the simulation waveform is outside the eye opening specification (designated by an internal hexagon) and does not traverse the eye opening, the specification is satisfied.

Referring to the drawings, the eye pattern spec and the output waveform, in case a differential output buffer not having the pre-emphasis function and a differential output buffer having the pre-emphasis function are used, will be described in more detail.

FIG. 14 shows an outline of an output waveform of an output buffer provided with no pre-emphasis function. In FIG. 14, True and Bar indicate a non-inverted signal and an inverted signal of the differential signal, respectively. The eye pattern is obtained on partitioning the waveform of FIG. 14 every 1-bit data, followed by superposition.

FIG. 15 shows an outline of the output waveform of an output buffer provided with the pre-emphasis function. The output waveform shown in FIG. 15 is one obtained by effecting pre-emphasis to the output signal shown in FIG. 14. In FIG. 15, both the True and Bar signals are pre-emphasized in terms of one bit as a unit.

FIG. 16 is a partial view showing a portion (1) in FIG. 15 to an enlarged scale. Specifically, FIG. 16 shows an output waveform in case pre-emphasis is in operation. As noted previously, the start potential of the output waveform for a case where the output waveform is inverted from the pre-emphasis operating state (pre-emphasis on state) differs from that for a case where the output waveform is inverted from the pre-emphasis non-operating state (pre-emphasis off state), thus producing difference in delay between the rise and fall of the waveform. This difference in delay presents itself as a jitter.

In case the jitter is increased, the eye opening is necessarily reduced in size, with the result that the signal level as recognized at the receiving end is deteriorated and hence the desired transmission rate cannot be achieved.

On the other hand, since the amount of signal attenuation differs with the type of the transmission medium and with the transmission speed, it is customary to arrange an output buffer which is able to vary a pre-emphasis level in a designing stage of semiconductor devices. For example, such control is exercised for weakening the efficacy of or not using the pre-emphasis, for a transmission medium subject to lesser attenuation, for a shorter transmission distance or for a low transmission rate, or for augmenting the efficacy of the pre-emphasis for a fast transmission speed.

FIG. 17 shows a simulation output waveform for the case where there is provided no pre-emphasis function, specifically, a simulation output waveform for a case where the signal level for pre-emphasis on state is reduced to approximately the same level as that for the pre-emphasis off state. The jitter is only small because the signal rise timing is equal to the signal fall timing. That is, if the delay caused in the transmission line is not taken into account, requirements for jitter characteristics are more stringent for the case where there is provided the pre-emphasis function.

FIG. 18A is a diagram illustrating the reason why jitter is increased in case variations in the semiconductor fabrication process or variations in measurement are taken into account in case there is provided no pre-emphasis as in FIG. 17. FIG. 18B is a diagram illustrating the reason why jitter is increased in case variations in the semiconductor fabrication process or variations in measurement are taken into account in case there is provided the pre-emphasis function as in FIG. 16. From comparison of FIGS. 18A and 18B, it may readily be seen that differential delay is produced more apparently in rise timing or in fall timing of the waveform when the pre-emphasis is on than when the pre-emphasis is off, thus increasing the jitter.

An output buffer circuit according to the present invention reduces jitter by producing capacitive coupling when the output signal is changed. The present invention, in one aspect, provides an output buffer circuit having the function of driving a transmission line with an output signal subjected to pre-emphasis for a predetermined time period in case of change in a logic signal, wherein a capacitor is provided across an input end and an output end of the output buffer in such a manner as to suppress jitter ascribable to difference between the pre-emphasis on state and the pre-emphasis off state directly before change in the logic signal.

In another aspect, the present invention provides an output buffer circuit including: a first buffer circuit, receiving a first logic signal as an input, for driving the transmission line, a second buffer circuit including: a buffer receiving a second logic signal that is set in a predetermined logical relationship to the first logic signal, as an input and having an output thereof connected in common with an output of the first buffer circuit, and at least one switch connected across the buffer and a power supply and controlled to be turned on or off based on a signal supplied to a control terminal thereof, and at least one capacitor connected across an input terminal of the first buffer circuit and a connection node between the buffer and the switch in the second buffer circuit.

The output buffer circuit according to another aspect of the present invention, may include a first buffer circuit, receiving a first logic signal as an input, for driving a transmission line, a second buffer circuit including a buffer receiving a second logic signal that is set in a predetermined logical relationship to the first logic signal, as an input, and having an output thereof connected in common with an output of the first buffer circuit, and at least one switch connected across the buffer and a power supply and controlled to be turned on or off based on a signal supplied to a control terminal thereof, and a capacitor connected across a control terminal of the switch and a connection node between the buffer and the switch in the second buffer circuit.

The output buffer circuit according to yet another aspect of the present invention, may include a first buffer circuit receiving a first logic signal as an input, for driving a transmission line, a second buffer circuit receiving a second logic signal that is set in a predetermined logical relationship to the first logic signal, as an input, and having an output terminal thereof connected in common with an output terminal of the first buffer circuit, and a capacitor connected across an input terminal of the first buffer circuit and a common output terminal of the first and second buffer circuits.

In the output buffer circuit, according to the present invention, the capacitor may be preferably formed by a capacitance between interconnections. The capacitance value of the capacitor may be made selectable by changing over the distance between the interconnections prescribing the capacitance between the interconnections.

The semiconductor device in a further aspect of the present invention includes, as an output buffer circuit, any of the above-defined output buffer circuits of the present invention.

The meritorious effects of the present invention are summarized as follows.

According to the present invention, capacitance coupling is produced in the output buffer circuit having the pre-emphasis function, when the output signal is changed, thereby reducing the jitter. Moreover, according to the present invention, techniques in capacitance coupling, exploiting the cross-talk, may be employed to reduce the jitter as the capacitance across the output terminals is suppressed from increasing.

Still other effects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4A is a diagram showing, by eye pattern representation, a simulation waveform, at a driver end and at a receiver end, of a comparative case, FIG. 4B is a diagram showing, by eye pattern representation, a simulation waveform, at a driver end and at a receiver end, of the first embodiment of the present invention, and FIG. 4C is a diagram showing the results of comparison of the simulation by the conventional circuit and that by the first embodiment.

PREFERRED EMBODIMENTS OF THE INVENTION

Preferred embodiments of the present invention will now be described. According to the present invention, capacitance coupling is produced when the output signal is changed, in an output (I/O) circuit of a semiconductor integrated circuit, thereby reducing jitter at the time of high-speed transmission. The output (I/O) circuit is provided with the pre-emphasis function, that is, the function of emphasizing the amplitude of a transmission signal on the transmitting side when the signal is changed, in order to prevent pattern-dependent deterioration of the transmission signal, thereby improving the waveform on the receiving end.

An output buffer circuit, in one mode for practicing the present invention, includes a first buffer circuit (M1) (inverting buffer circuits (T1, T2)), receiving a first logic signal to drive the transmission line (L), and a second buffer circuit (M2). The second buffer circuit (M2) includes an inverting buffer (T4, T5), a first switch (T3), a second switch (T6), and first and second capacitors (Z1, Z2).

The inverting buffer (T4, T5), receives a second logic signal having a value set in a predetermined logical relationship with respect to the aforementioned first logic signal, and has an output connected in common with an output of the aforementioned first buffer circuit (M1).

The first switch (T3) is connected across a first terminal of the inverting buffer (T4, T5) (source electrode of T4) and a first power supply (VDD), and is controlled to be turned on or off based on a signal supplied to a control terminal thereof.

The second switch (T6) is connected across a second terminal of the inverting buffer (T4, T5) (source electrode of T5) and a second power supply (VSS) and is controlled to be turned on or off based on a signal supplied to a control terminal thereof in association operatively with the first switch (T3).

The first capacitor (Z1) is provided across an input end (AA) of the first buffer circuit (M1) and a connection node (AD) between the inverting buffer (T4, T5) and the second switch (T6) in the second buffer circuit (M2).

The second capacitor (Z2) is provided across an input end (AA) of the first buffer circuit (M1) a connection node (AC) between the inverting buffer (T4, T5) and the first switch (T3) in the second buffer circuit (M2).

In the semiconductor device of the present embodiment, the capacitors (Z1 and Z2) may be formed by, for example, capacitors between interconnections (line), so that optimum capacitance values may be selected by switching the spacing between the interconnections. The embodiments of the present invention will now be described in detail with reference to the accompanying drawings.

Figure 1:
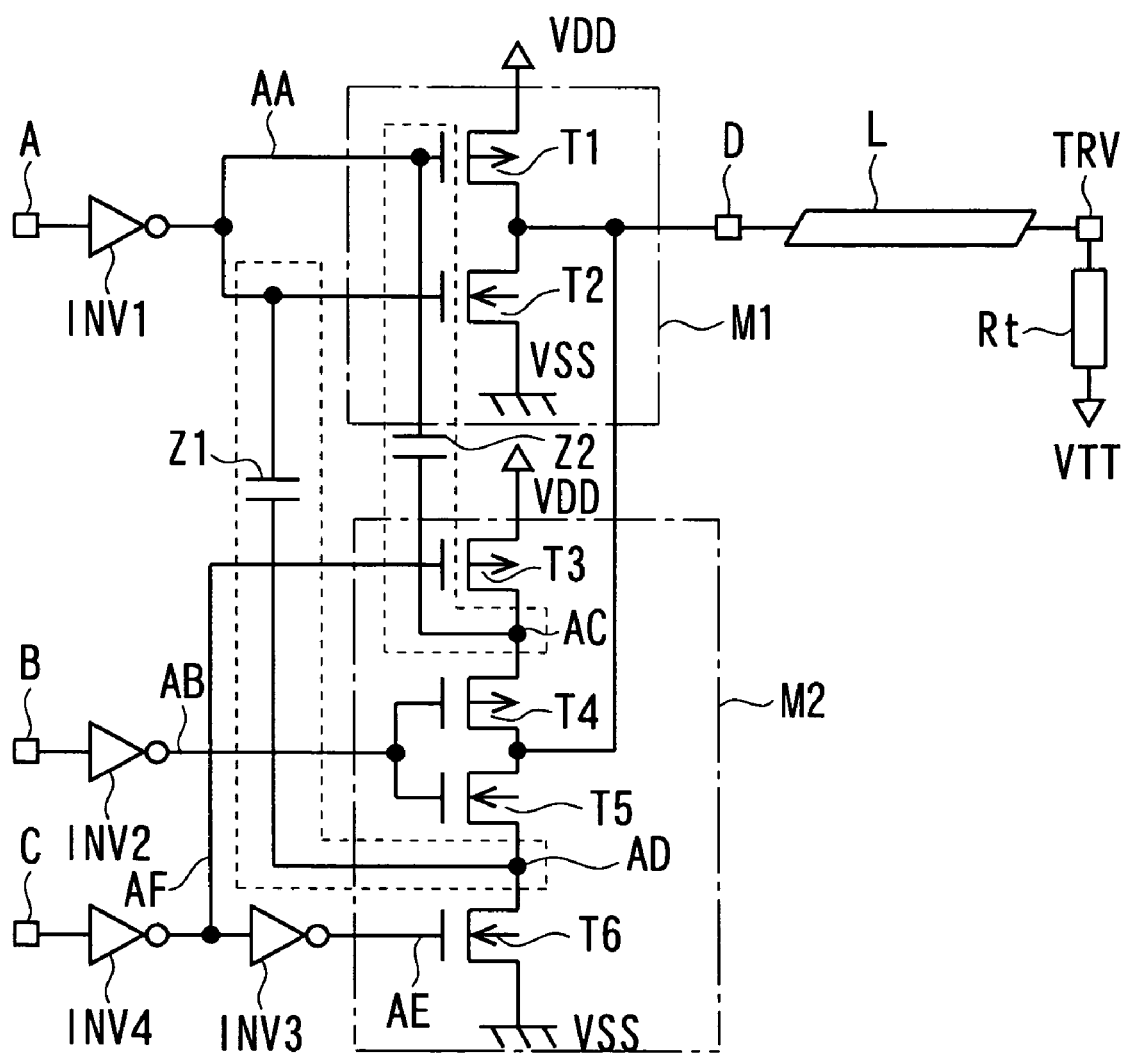
FIG. 1 is a diagram showing a circuit configuration of a first embodiment of the present invention.

FIG. 1 illustrates the circuit configuration of an embodiment of the present invention. Referring to FIG. 1, the first buffer M1, receiving, as an input, a signal output from an inverter INV1 which receives and inverts a signal supplied to a terminal A, includes a first P-channel field effect transistor T1, having a source electrode connected to a high potential power supply VDD, and a first N-channel field effect transistor T2, having a source electrode connected to a low potential power supply VSS. The gate electrodes of the field effect transistors T1 and T2 are connected in common with an output terminal of the inverter INV1. The connection node of drain electrodes of the two transistors T1 and T2 is connected to an output terminal D.

The second buffer circuit M2, receiving, as an input, a signal output from an inverter INV2 which receives and inverts a signal supplied to a terminal B, includes a second P-channel field effect transistor T3, having a source electrode connected to the high potential power supply VDD, a third P-channel field effect transistor T4, having a source electrode connected to a drain electrode of the second P-channel field effect transistor T3, a second N-channel field effect transistor T6, having a source electrode connected to the low potential power supply VSS, and a third N-channel field effect transistor T5, having a source electrode connected to a drain electrode of the second N-channel field effect transistor T6. The gate electrodes of the field effect transistors T4 and T5 are connected in common with the output terminal of the inverter INV2, and the connection node of the drain electrodes thereof is connected to the output terminal D. The gate electrode of the second P-channel field effect transistor T3 is supplied with a signal from the terminal C, inverted by the inverter INV4, whilst the gate electrode of the second N-channel field effect transistor T6 is supplied with a signal corresponding to the output of the inverter INV4 inverted by the inverter INV3. The field effect transistors T3 and T6 operate as switches that are turned on and off when the signal at the terminal C is at a high level and at a low level, respectively.

In addition, a common connection node (AA) of the gate electrodes of the field effect transistors T1 and T2 of the first buffer circuit M1 and a connection node (AD) between the drain electrode of the second N-channel field effect transistor T6 and the source electrode of the third N-channel field effect transistor T5 in the second buffer circuit M2 are connected via a capacitor Z1, whilst the common connection node (AA) of the gate electrodes of the field effect transistors T1 and T2 and a connection node (AC) between the drain electrode of the second P-channel field effect transistor T3 and the source electrode of the third P-channel field effect transistor T4 in the second buffer circuit M2 are connected via a capacitor Z2.

Figure 7:
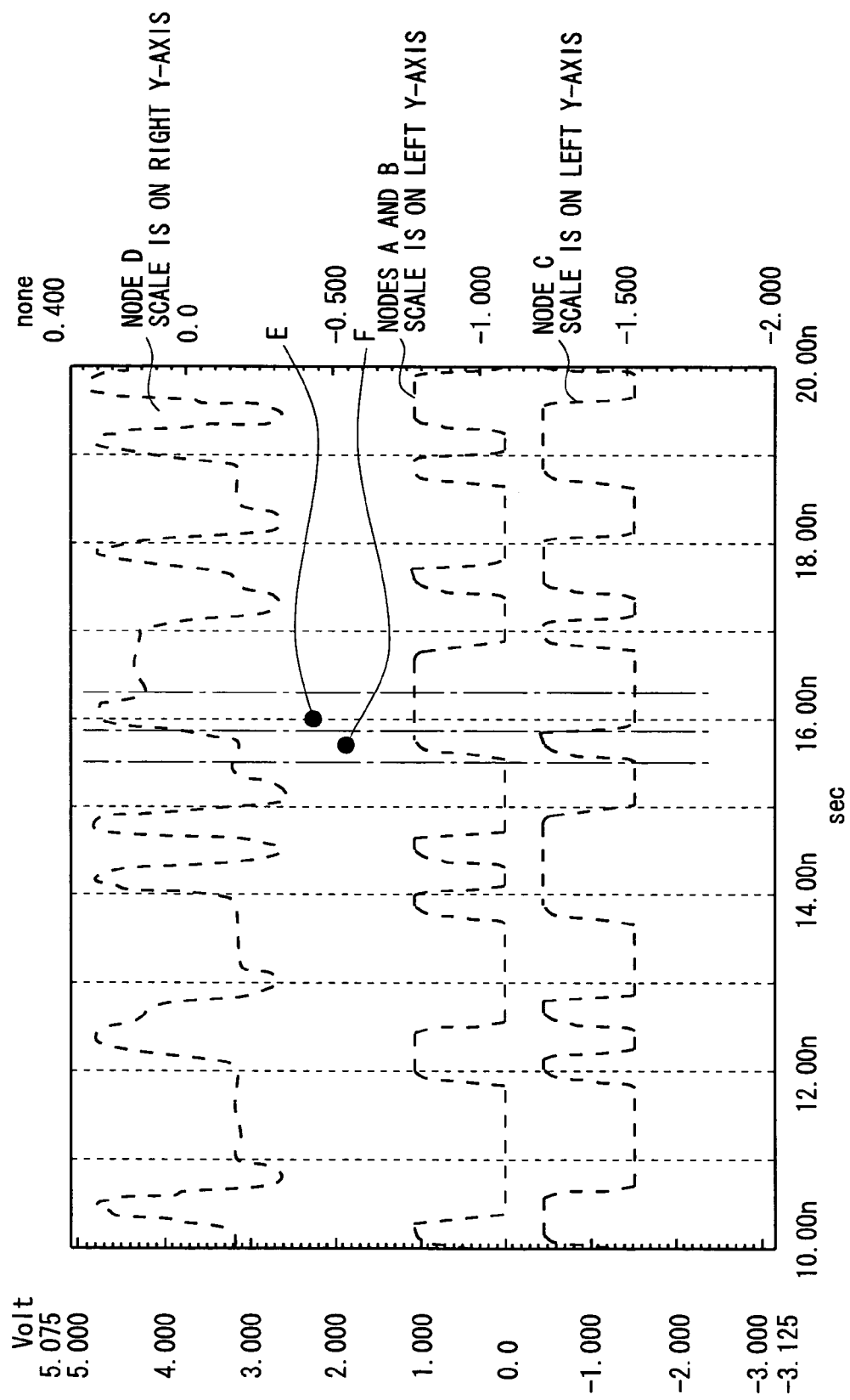
FIG. 7 is a diagram showing a signal waveform at an internal node in the first embodiment of the present invention.

The nodes A and B of FIG. 1 are supplied e.g. with signal waveforms designated by the nodes A and B in FIG. 7, respectively. Here, the same signals are supplied to the nodes A and B. The node C of FIG. 1 is supplied with a signal indicated by the node C in FIG. 7. When the input signals to the nodes A and B and the input signal to the node C in FIG. 1 are in such states as shown by an area F in FIG. 7 (with the nodes A, B and the node C then transitioning to a high level), the output of the inverter INV1 of FIG. 1 transitions from a high level to a low level, with the P-channel field effect transistor T1 then being turned on. The output node (AB) of the inverter INV2 of FIG. 1 then transitions from a high level to a low level to turn on the P-channel field effect transistor T4. The output signal of the inverter INV4 transitions from a high level to a low level to turn on the P-channel field effect transistor T3. The N-channel field effect transistors T2 and T5 are both turned off.

Hence, the output signal from the node D (output terminal of the buffer circuit) is in a pre-emphasis-on state, such that the waveform of the node D is caused to rise rapidly, by cooperation of the first output buffer M1 and the second output buffer M2, as indicated in a waveform area E of the node D of FIG. 7.

Figure 2:
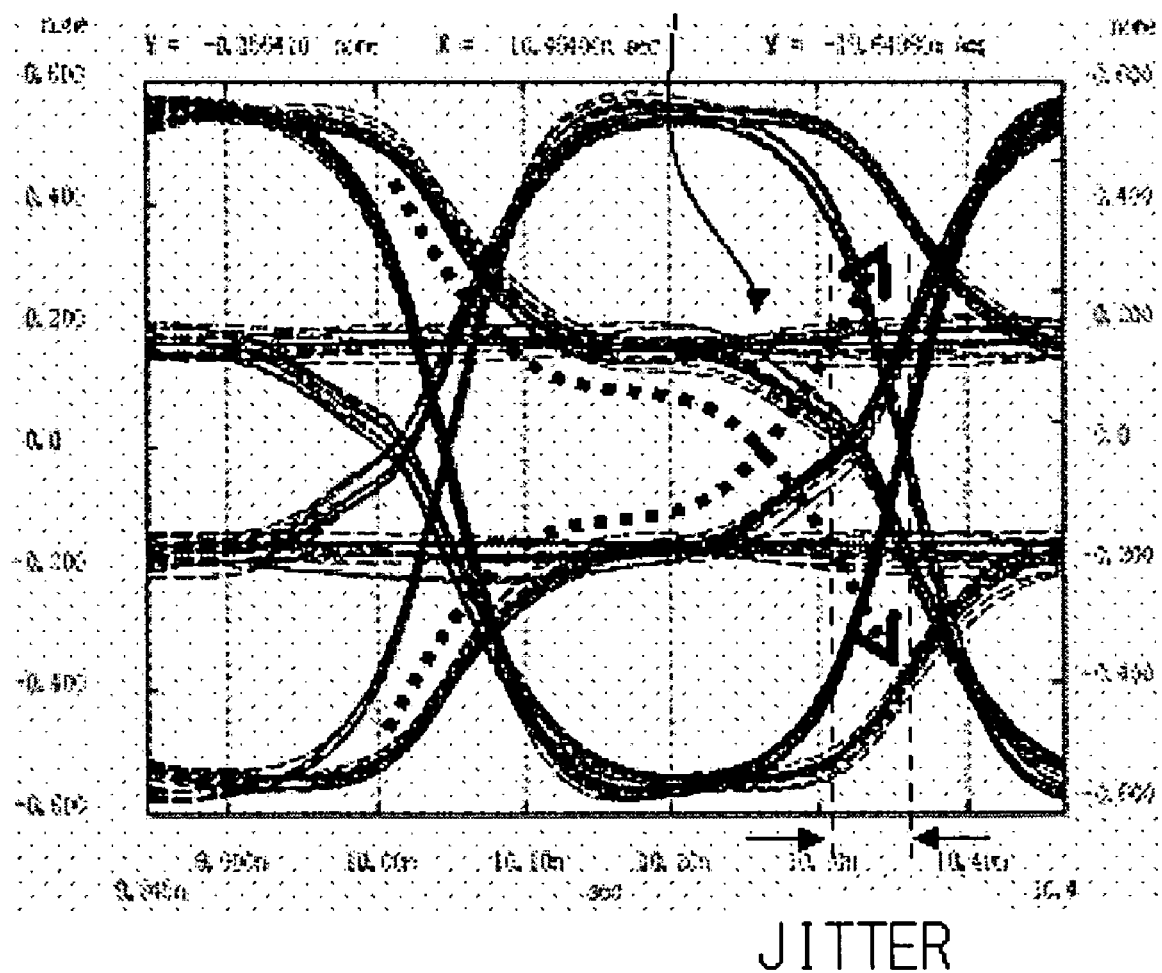
FIG. 2 is a diagram showing, by eye pattern representation, a simulation waveform in a comparative case (conventional circuit).
Figure 3:
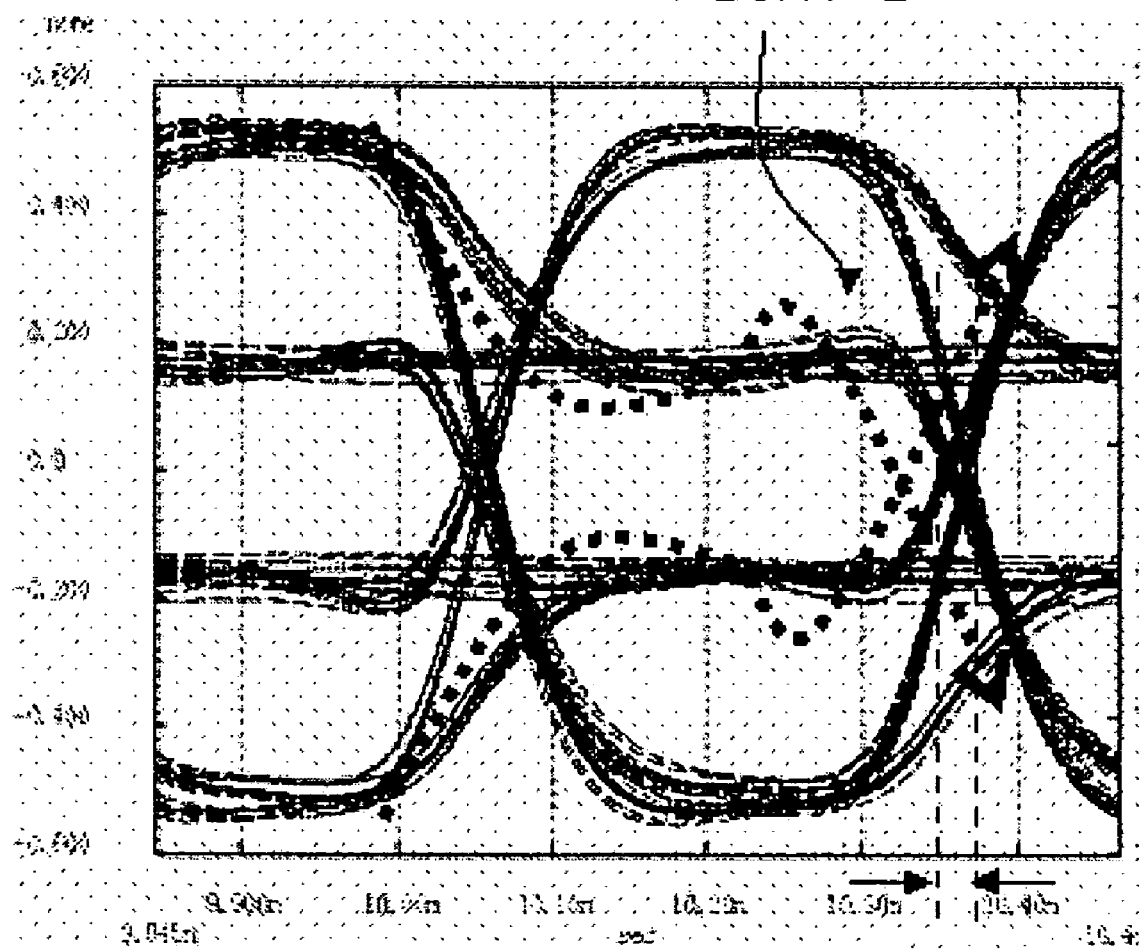
FIG. 3 is a diagram showing, by eye pattern representation, a simulation waveform in the first embodiment of the present invention.
Figure 10:
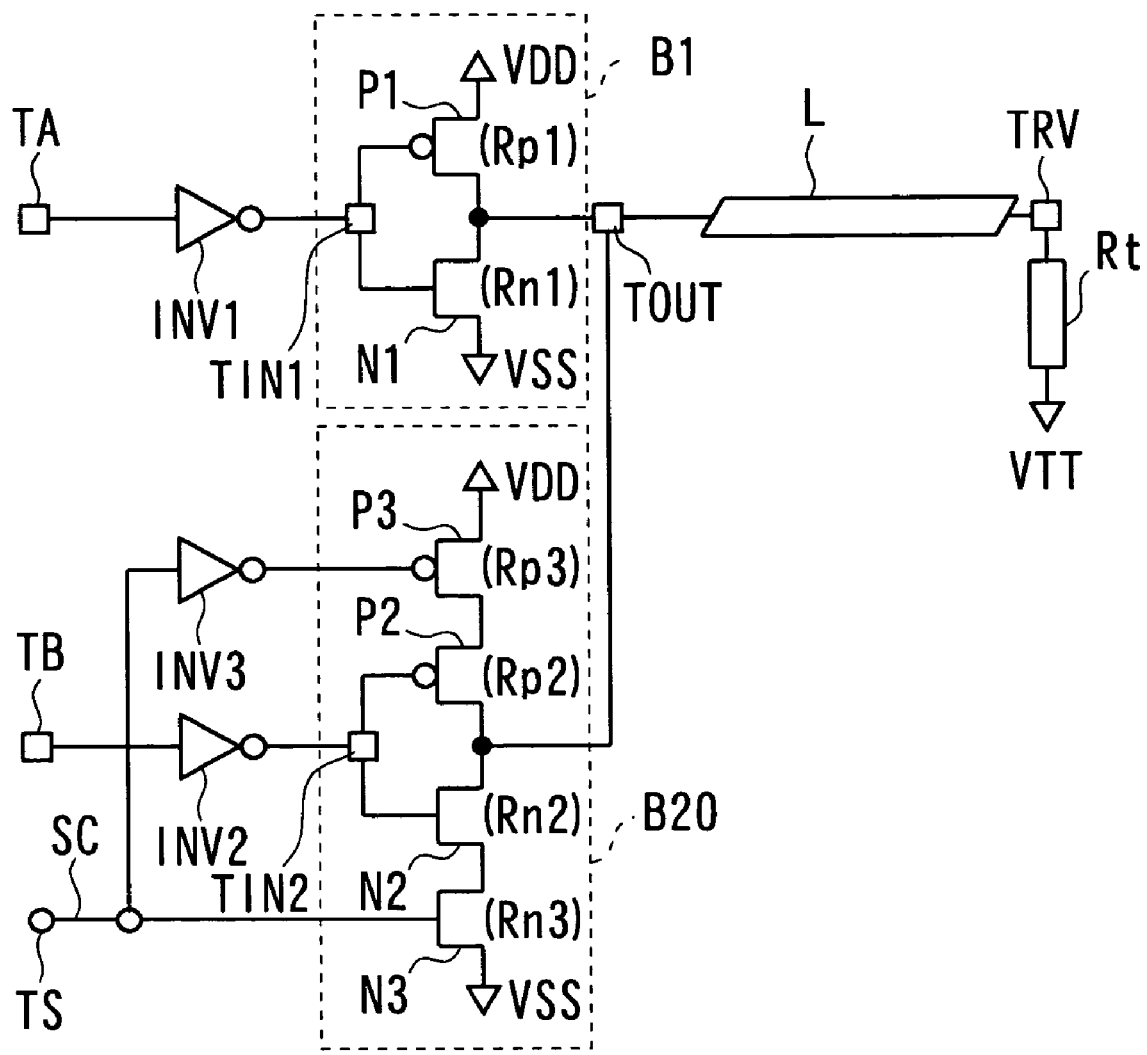
FIG. 10 is a diagram showing another configuration of another conventional output buffer circuit.
Figure 11:
FIG. 11 is a diagram showing a signal waveform of the circuit of FIG. 9.
Figure 11:
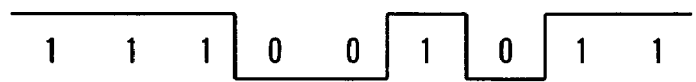
Figure 11:
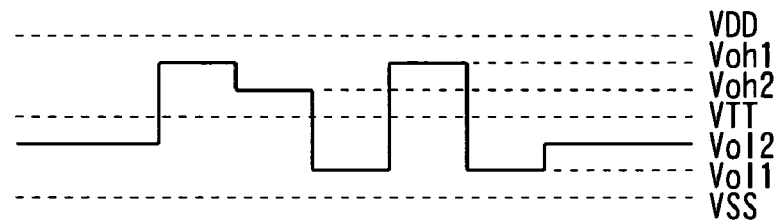
Figure 12:
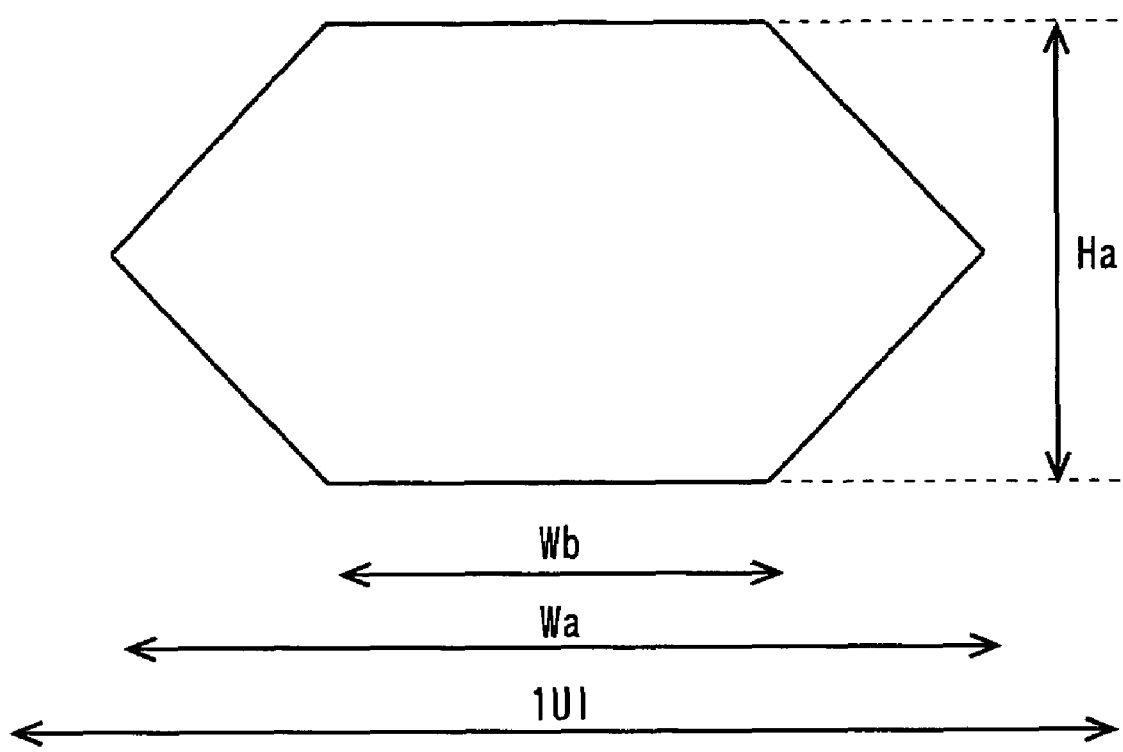
FIG. 12 is a diagram illustrating an eye pattern specification.
Figure 13:
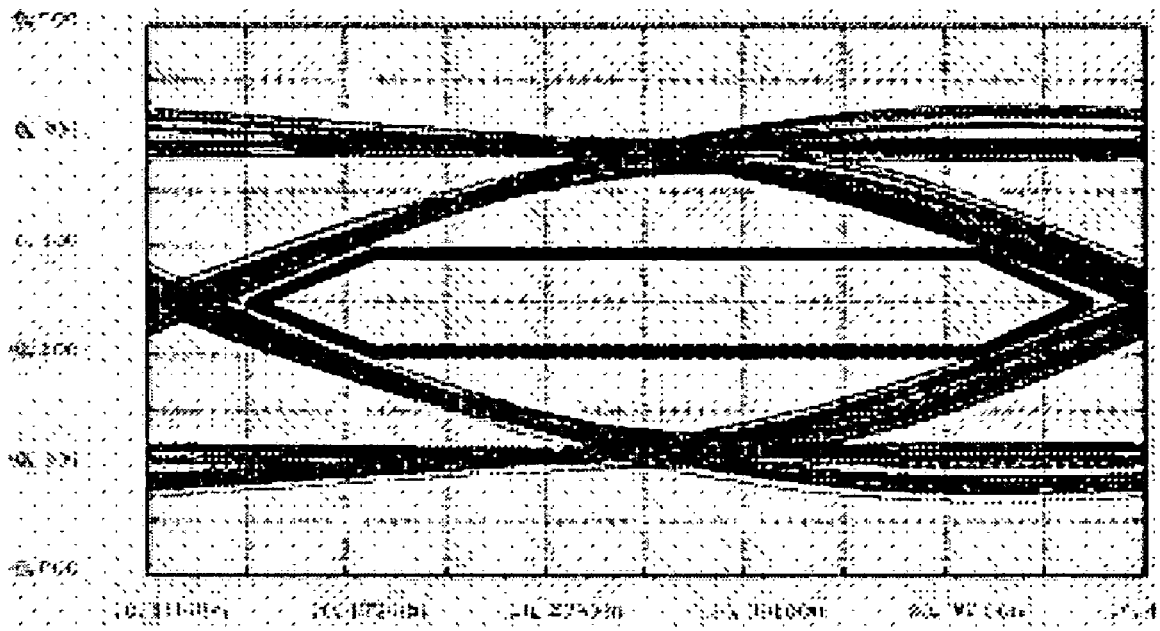
FIG. 13 is a diagram illustrating the relationship between the simulation waveform and the eye pattern specification.
Figure 14:
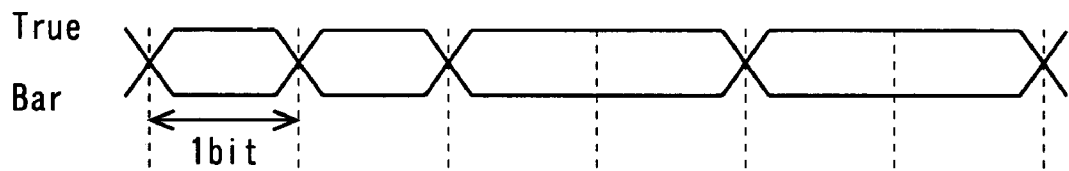
FIG. 14 is a diagram illustrating an output waveform for a case not having a pre-emphasis function.
Figure 15:
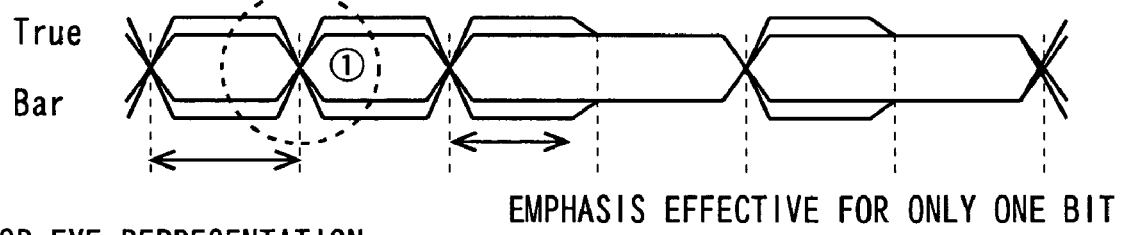
FIG. 15 is a diagram illustrating an output waveform for a case having a pre-emphasis function.
Figure 16:
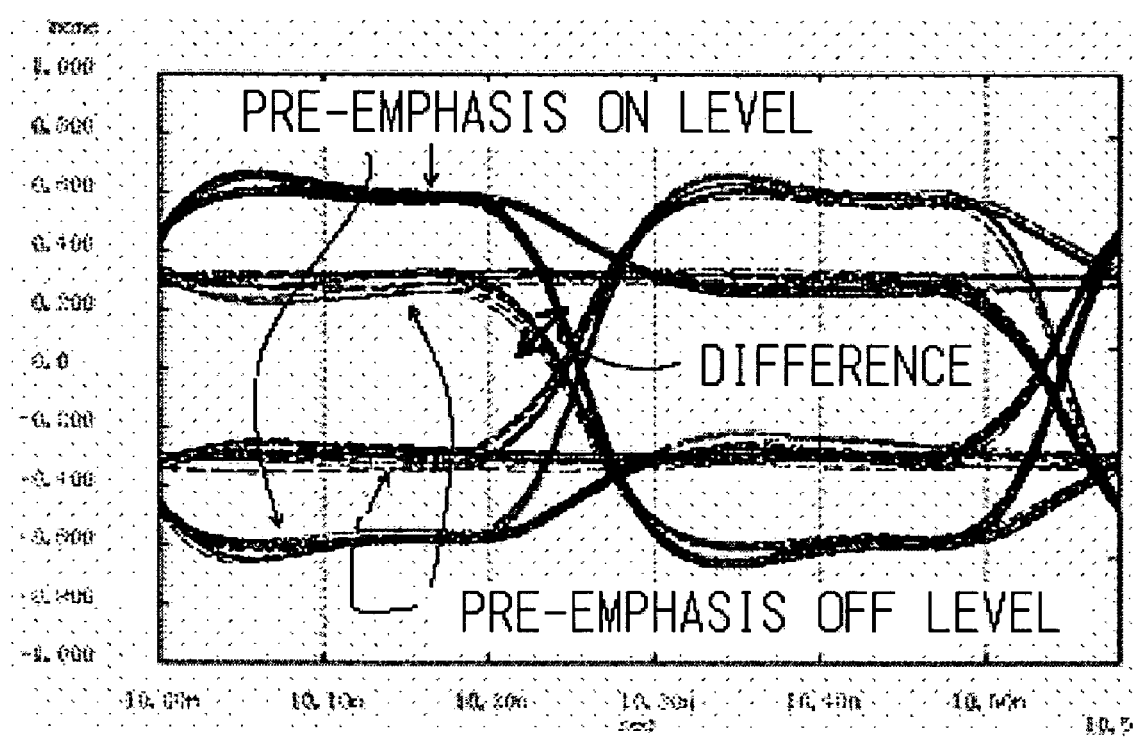
FIG. 16 is a diagram showing a simulation output waveform, in an eye pattern representation, for a case having a pre-emphasis function.
Figure 17:
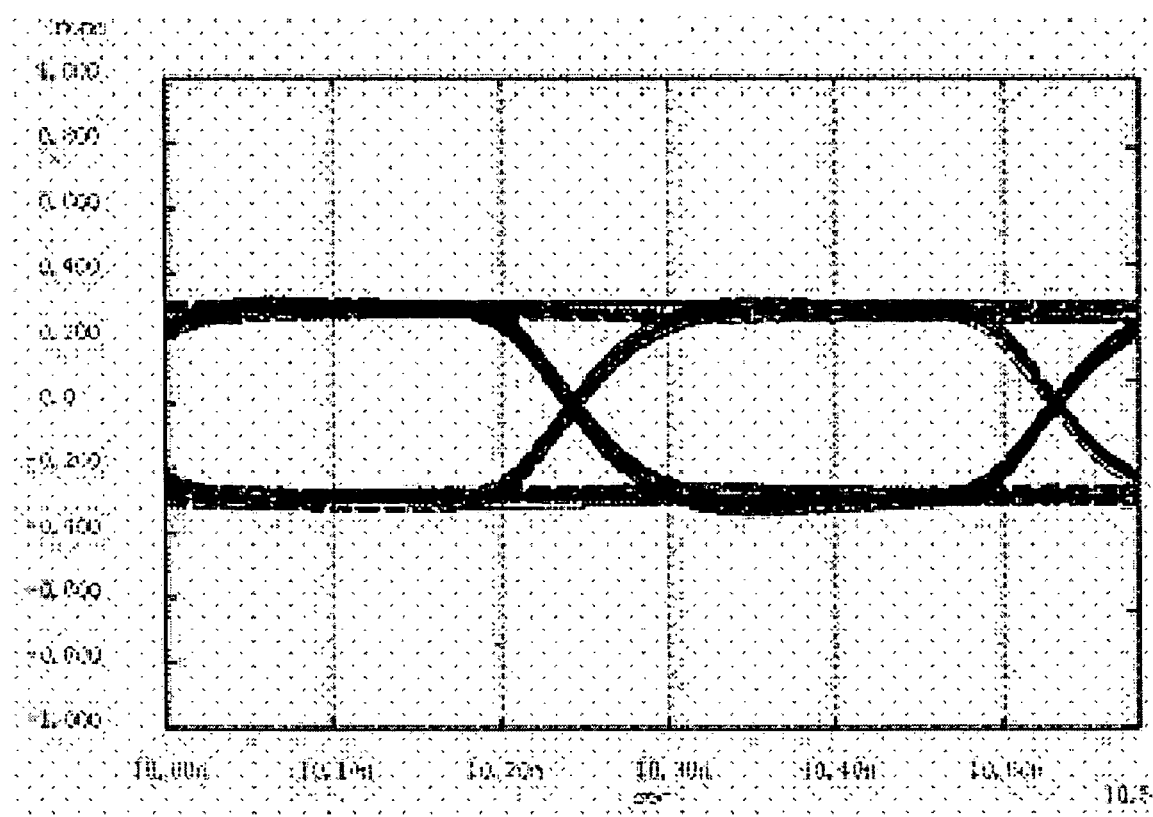
FIG. 17 is a diagram showing a simulation output waveform, in an eye pattern representation, for a case not having a pre-emphasis function.
Figure 18A:
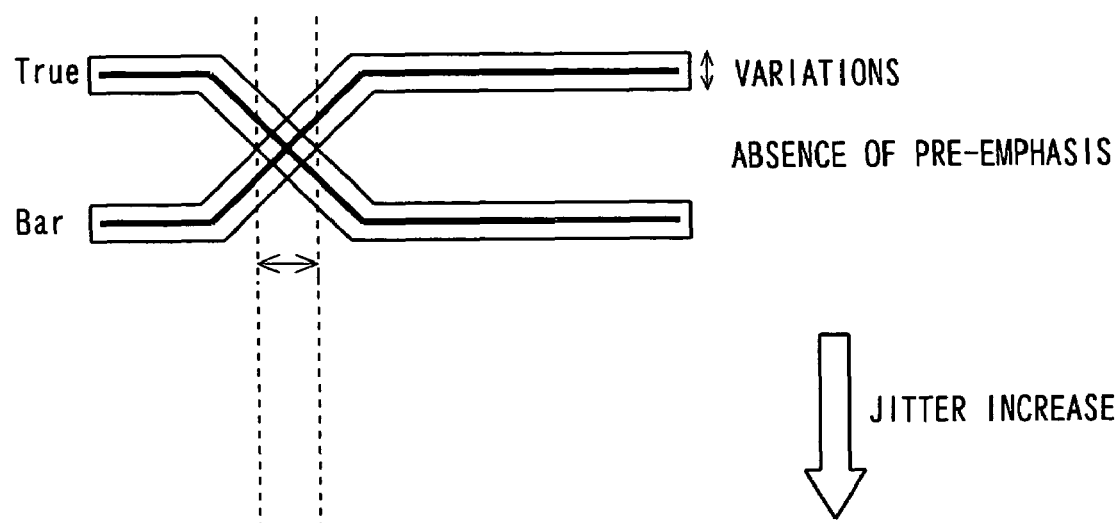
FIG. 18A is a diagram illustrating the reason why the jitter is produced in the absence of pre-emphasis and FIG. 18B is a diagram illustrating the reason why the jitter is produced in the presence of pre-emphasis
Figure 18B:
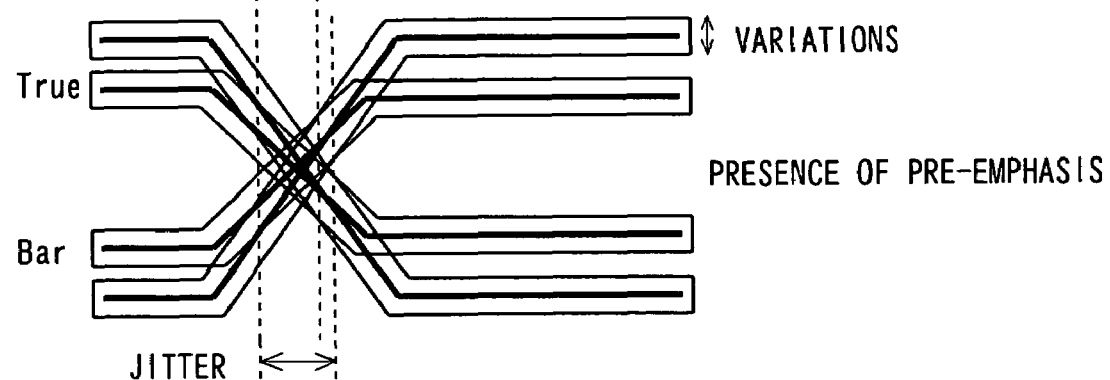

It is assumed that there is a delay, corresponding to an area F, as from the time of rise of input data of the nodes A to C until rise of the node D from a low level to a high level. Since the capacitor Z2 is connected across the common connection node (AA) of gate electrodes of the P-channel field effect transistor T1 and the N-channel field effect transistor T2 and the node AC in the second buffer M2 (pre-emphasis unit), and the capacitor Z1 is connected across the common connection node (AA) of gate electrodes of the P-channel field effect transistor T1 and the N-channel field effect transistor T2 and the node AD in the second output buffer M2, the N-channel field effect transistors T2 and T5 commence to be turned on, while the P-channel field effect transistors T1, T4 commence to be turned off, at a point B in FIG. 3. At this time, the P-channel field effect transistor T3 and the N-channel field effect transistor T6 also commence to be turned on. The transition of the other signal of the differential signal is the reverse of the signal transition described above. Meanwhile, FIG. 3 shows a simulation waveform of the embodiment shown in FIG. 1 (eye pattern representation), whilst FIG. 2 shows a simulation waveform (eye pattern representation) of the conventional circuit shown in FIG. 10.

In the present embodiment, the capacitors Z1 and Z2 are provided for delaying changes in the voltage at the point D, accompanying changes in the voltages at the points A and B, for a case where the voltage at the point C directly before change in the voltages A and B is at a low level, with the pre-emphasis state being a pre-emphasis off state. In this manner, the time as from the change in the voltages at the points A and B until the voltage change at the point D is made equal, without dependency on whether or not the pre-emphasis state prevailing directly before voltage change at the points A and B is the pre-emphasis-on state, thereby improving jitter characteristics.

That is, if, when the potential at the point AA and that at the point AB are about to be changed from high to low, the pre-emphasis at a directly previous time point is off, the field effect transistor T3 is turned off, such that the potential at the point AC is about to be lowered with decrease in the potential at the point AA. However, the potential at the point AF is decreased simultaneously with decrease in the potential at the point AA. The field effect transistor T3 then commences to be turned on. When the field effect transistor T3 is turned on, the potential at the point AC commences to rise, so that the capacitor Z2 operates for suppressing the lowering of the potential at the point AA to delay the turning on of the field effect transistor T1.

On the other hand, if, when the potential at the points AA and AB are about to be changed from high level to low level, the directly previous pre-emphasis state is the pre-emphasis-on state, the field effect transistor T3 is turned on, so that the potential at the point AC is fixed at VDD, and hence there is no possibility of change in the potential at the point AC operating for suppressing changes in the potential at the point AA. Consequently, the difference in time required for the potential at the point D to rise to a high level, caused in dependence upon whether the pre-emphasis state directly before the potential at the points AA and AB is changed from a high level to a low level is the pre-emphasis on state or the pre-emphasis off state, may be suppressed by the capacitor Z2.

In similar manner, the difference in time required for the potential at the point D to fall to a low level, caused in dependence upon whether the pre-emphasis state directly before the potential at the points AA and AB is changed from a low level to a high level is the pre-emphasis on state or the pre-emphasis off state, may be suppressed by the capacitor Z1. Thus, by suitably selecting the capacitance values of Z1 and Z2, it is possible to suppress generation of jitter otherwise caused in dependence upon whether the pre-emphasis state directly before the change in the logic signal is the pre-emphasis on state or the pre-emphasis off state.

Moreover, in the present embodiment, in which the capacitors Z1 and Z2 are added to the node AD (a connection node between the transistors T5 and T6) and to the node AC (junction of the transistors T3 and T4), respectively and not directly connected to the output terminal D, thereby preventing the capacitance of the output terminal D from increasing.

FIGS. 4A-4C show the results of comparison of a conventional circuit (configuration of FIG. 10) and the circuit of the embodiment of FIG. 1, under the condition in which there are attached transmission lines (L in FIG. 1) of a length of 1 m, equivalent to a FR4 (Laminate), with the power supply voltage=1.1V, Tj=25° C. and the operating frequency=1.6 GHz, to the conventional circuit and the circuit according to the present embodiment, respectively. More specifically, FIGS. 4A and 4B show a driver end waveform and a receiver end waveform of the conventional circuit (comparative) and a circuit of the present embodiment, respectively. For both the driver end and the receiver end, it has been confirmed by simulation that, with the present embodiment, as compared to the conventional circuit (comparative), the jitter has been diminished as compared to the conventional circuit (comparative).

Figure 5:
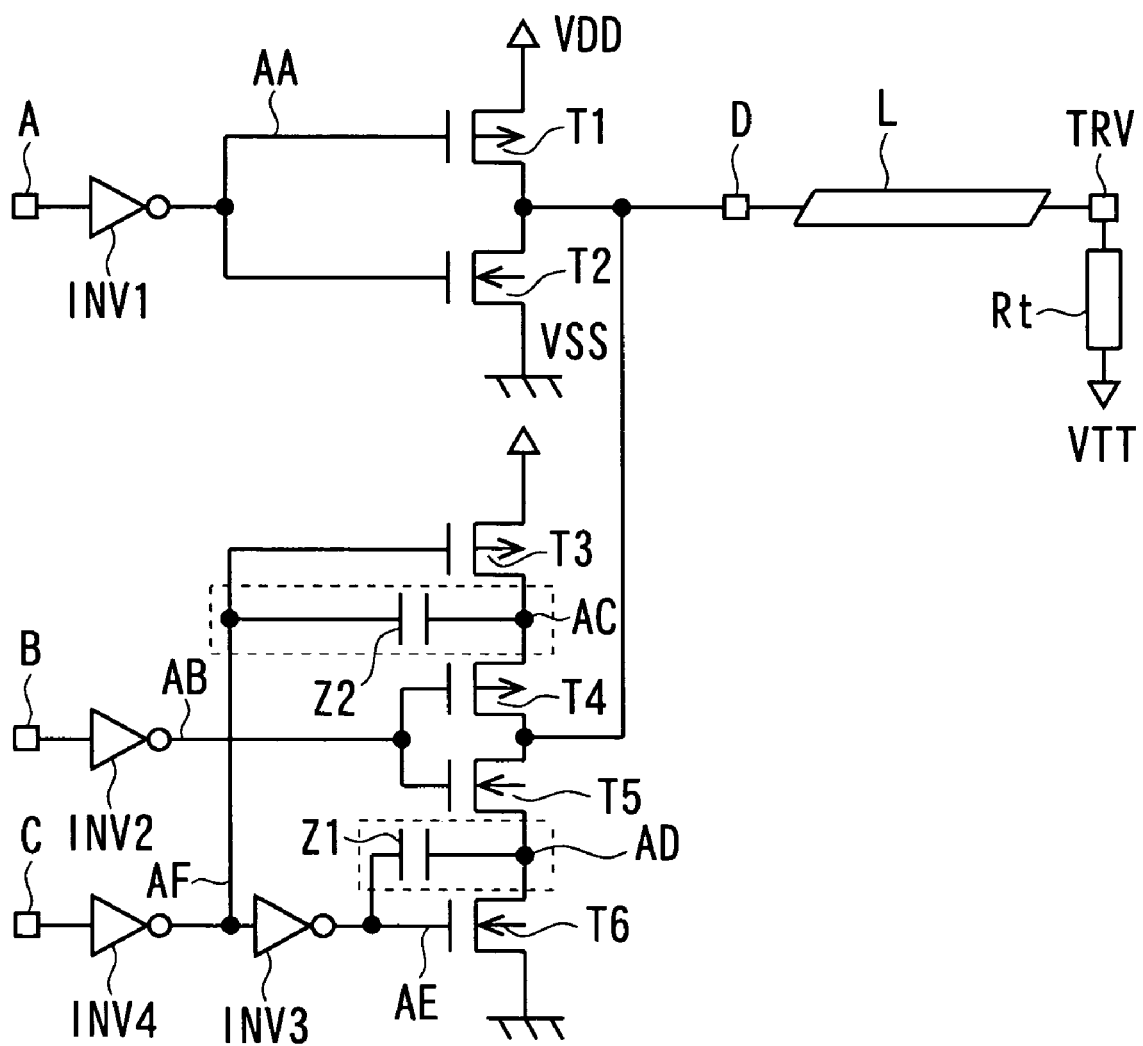
FIG. 5 is a diagram showing a circuit configuration of a second embodiment of the present invention.

A second embodiment of the present invention will now be described. FIG. 5 shows a configuration of the second embodiment of the present invention. The present embodiment differs from the above-described embodiment of FIG. 1 as to the connection configuration of the capacitors Z1 and Z2. The capacitor Z2 is connected across a node AF, as an output of the inverter INV4, and a connection node AC between the second and third P-channel field effect transistors T3 and T4, while the capacitor Z1 is connected across the node AE, as an output of the inverter INV3, and a connection node AD between the second and third N-channel field effect transistors T6 and T5. Otherwise, the configuration of the present second embodiment is the same as that of FIG. 1.

In the present embodiment, the P-channel field effect transistors T1 and T4 commence to be turned off, from the on-state, at the point B of FIG. 3, whilst the N-channel field effect transistors T2 and T5 commence to be turned on, from the off-state. Since the pre-emphasis state undergoes a transition from the off-state to the on-state, the node C undergoes a transition from a low level to a high level. The P-channel field effect transistor T3 and the N-channel field effect transistor T6 also commence to be turned on from the off-state.

At this time, the node AD is transiently pulled up towards a high level, at an instant of transition to a low level, by the coupling of the capacitor Z1, and hence the state shown at point B in FIG. 3 is reached, thus achieving the operation and the result equivalent to those of the previous embodiment.

If, on the other hand, the pre-emphasis state remains in the on-state, the point AD is fixed at the GND potential and hence the output is not delayed by the change in the potential of the point AD to render it possible to prevent generation of jitter ascribable to whether the pre-emphasis state directly previous to change in the logic signal is the pre-emphasis on state or the pre-emphasis off state.

Moreover, in the present embodiment, no capacitor is directly coupled to the output terminal D. Thus, the operation and results equivalent to those of the previous embodiment may again be achieved insofar as increase in capacitance at the output terminal D as seen from outside may be prevented from occurring.

Figure 6:
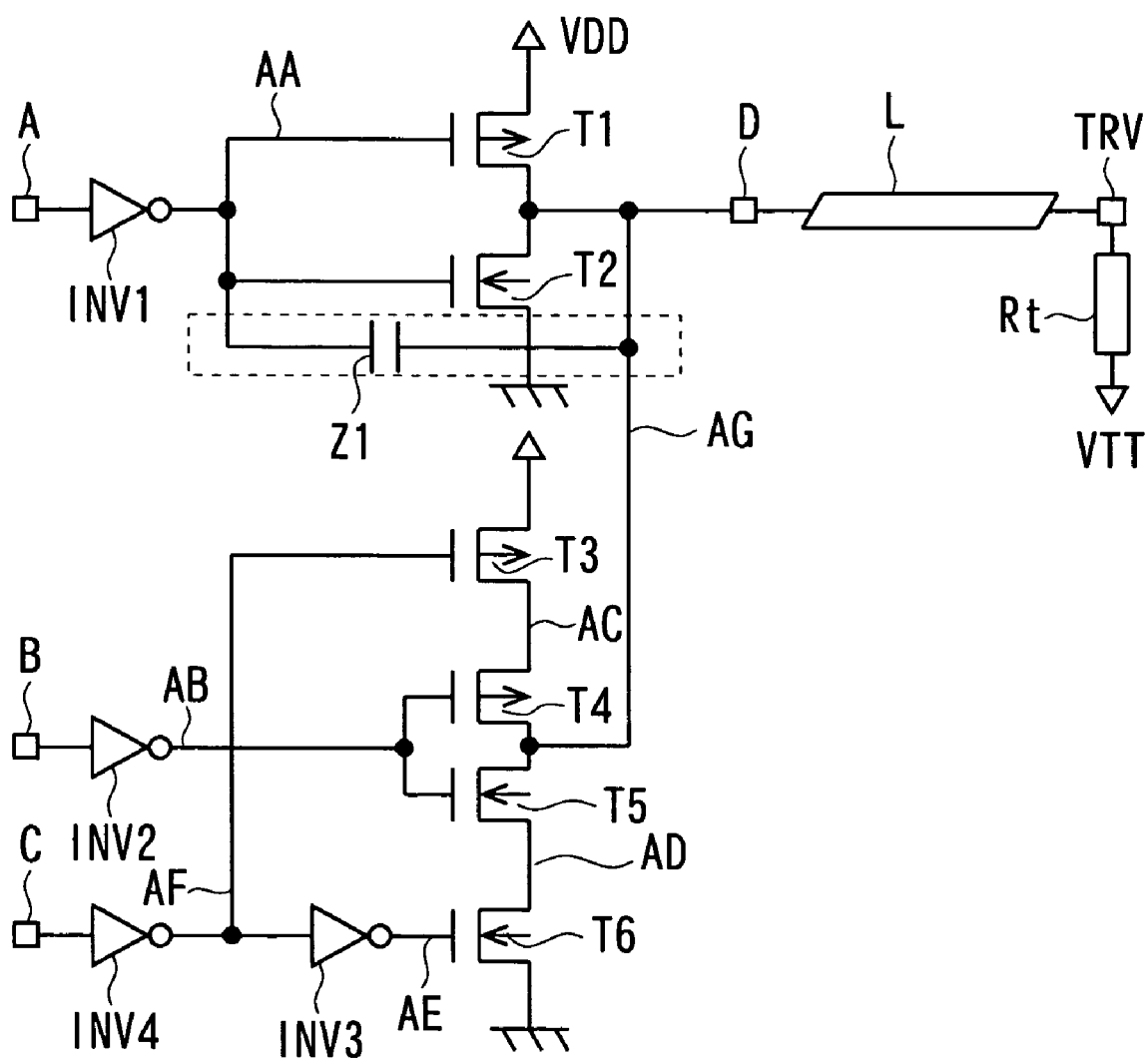
FIG. 6 is a diagram showing a circuit configuration of a third embodiment of the present invention.

A third embodiment of the present invention will now be described. FIG. 6 shows the configuration of the third embodiment of the present invention. The present embodiment differs from the embodiment shown in FIG. 1 as to the manner of connection of the capacitors Z1 and Z2. The capacitor Z1 is connected across the node of common connection AA of the gate electrodes of the field effect transistors T1 and T2 and the node AG (terminal D). The capacitor Z2, provided in FIG. 1, is not provided. Otherwise, the configuration of the present second embodiment is the same as that of FIG. 1.

At the point B of FIG. 3, the P-channel field effect transistors T1 and T4 commence to be turned off, from its on-state, whilst the N-channel field effect transistors T2 and T5 commence to be turned on, from its off-state. The P-channel field effect transistor T3 and the N-channel field effect transistor T6 also commence to be turned on from the off state. When the node AA is about to be changed, at the point B of FIG. 3, from a low level to a high level, the node AG is temporarily pulled up towards a high level side, due to the coupling by the capacitor Z1, thus achieving the operation and results comparable to those of the previous embodiment.

In the present embodiment, the capacitor Z1 is provided between the nodes AA and D, to delay an output by the buffer, made up by the field effect transistors T1 and T2 to take preference of the effect brought about by the field effect transistors T3 to T6, whereby it is possible to decrease the jitter ascribable to the difference between the pre-emphasis on state and the pre-emphasis off state.

Figure 8A:
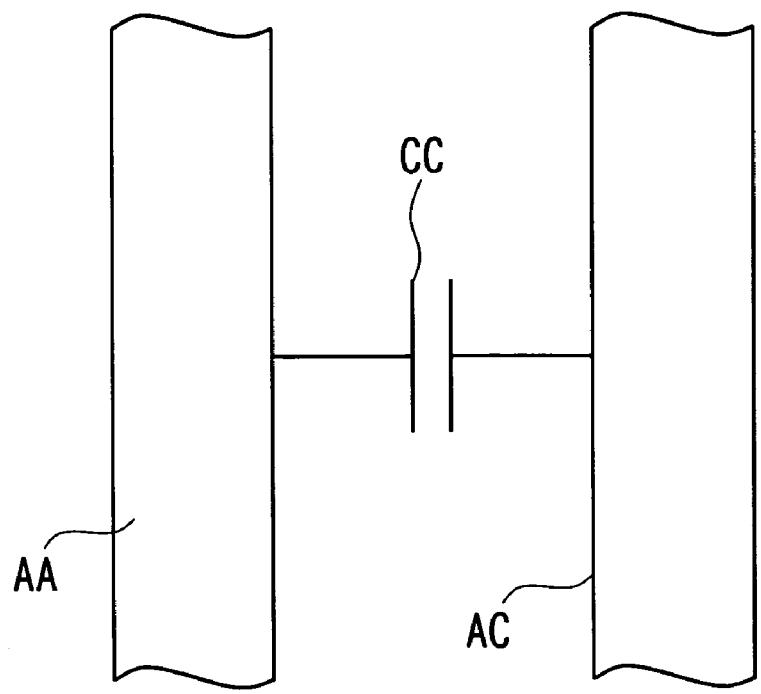
FIGS. 8A and 8B are diagrams showing a fourth embodiment of the present invention, and showing the cases of small capacitance and large capacitance between interconnections, respectively.
Figure 8B:
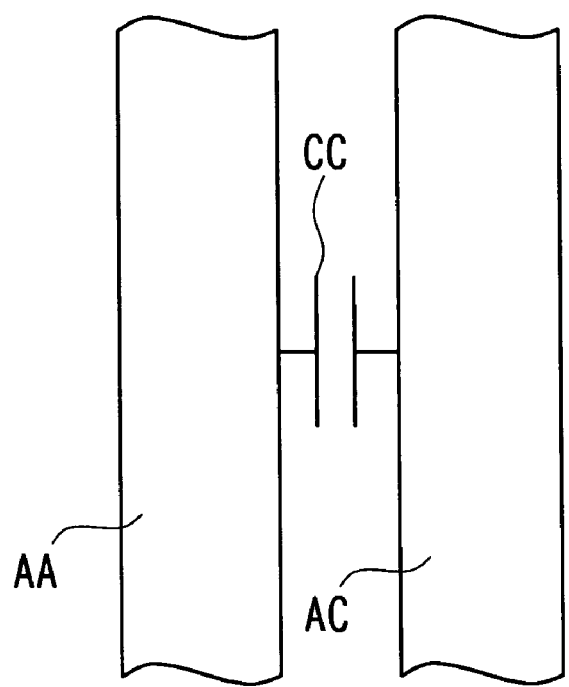
Figure 9:
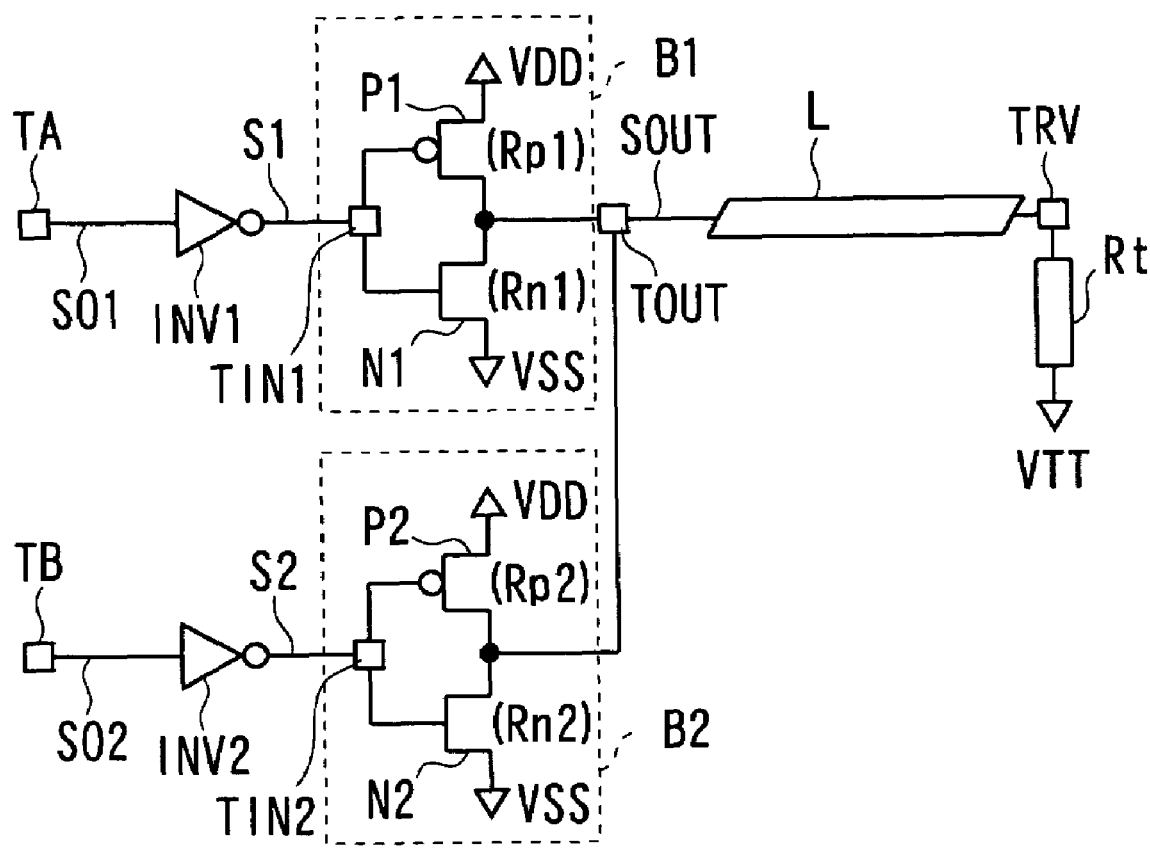
FIG. 9 is a diagram showing a configuration of a conventional output buffer circuit.

A fourth embodiment of the present invention will now be described. The capacitors Z1 and Z2 of FIGS. 1, 5 and 6 may be provided with the function of varying the capacitance values in dependence upon the signal level. As a method of adding the capacitors Z1 and Z2, the capacitance between the interconnections may be adjusted by simply changing the layout distance between the interconnections of the nodes AA and AC, as shown in FIGS. 8A and 8B. The configuration of FIG. 8A is stronger in coupling than that of the configuration of FIG. 8B, such that, by adding the function of switching the distance between the interconnections, it becomes possible to select the optimum capacitance value, in accordance with at least one of the pre-emphasis level, signal level and the power supply voltage level.

In case there are provided plural interconnection layers on a substrate of a semiconductor device, this changeover of the capacitance value by changing the distance between the interconnections may readily be achieved by providing a layout space for the uppermost interconnection layer, so that the capacitance between the nodes AA and AC may be changed simply by changing the layout of the uppermost interconnection layer.

There may also be provided such a circuit in which the capacitance may be changed by changing over a switch, not shown, by pre-stored data.

Although the present invention has so far been described with reference to preferred embodiments thereof, it is to be noted that the present invention is not limited to the embodiments described and may encompass various modifications or corrections that may readily occur to those skilled in the art within the scope of the invention as defined in the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An output buffer circuit having a function of driving a transmission line under application of pre-emphasis for a predetermined time period in case of change in a value of a logic signal to be output, comprising
at least one capacitor provided across an input side and a circuit providing said pre-emphasis of said output buffer circuit in such a manner as to suppress a jitter ascribable to a difference between a pre-emphasis on state and a pre-emphasis off state directly before a change in said logic signal.

2. The output buffer circuit according to claim 1, comprising:
a first buffer circuit, receiving a first logic signal as an input, for driving said transmission line;
a second buffer circuit including:
a buffer, receiving a second logic signal that is in a predetermined logical relationship to said first logic signal, as an input, said buffer having an output thereof connected in common with an output of said first buffer circuit; and
at least one switch connected across said buffer and a power supply and controlled to be turned on or off based on a signal supplied to a control terminal thereof; and
at least one capacitor, provided as said at least one capacitor, and connected across an input terminal of said first buffer circuit and a connection node between said buffer and said switch in said second buffer circuit.

3. The output buffer circuit according to claim 1 comprising
a first buffer circuit, receiving a first logic signal as an input, for driving said transmission line;
a second buffer circuit including:
a buffer, receiving a second logic signal that is in a predetermined logical relationship to said first logic signal, as an input, said buffer having an output thereof connected in common with an output of said first buffer circuit; and
at least one switch connected across said buffer and said power supply and controlled to be turned on or off based on a signal supplied to a control terminal thereof; and
a capacitor, provided as said at least one capacitor, and connected across a control terminal of said switch and a connection node between said buffer and said switch in said second buffer circuit.

4. The output buffer circuit according to claim 1, comprising:
a first buffer circuit, receiving a first logic signal as an input, for driving said transmission line;
a second buffer circuit, receiving a second logic signal that is in a predetermined logical relationship to said first logic signal as an input, said second buffer circuit having an output terminal thereof connected in common with an output terminal of said first buffer circuit; and
a capacitor, provided as said at least one capacitor, connected across an input terminal of said first buffer circuit and a common output terminal of said first and second buffer circuits.

5. The output buffer circuit according to claim 1, comprising:
a first buffer circuit, receiving a first logic signal as an input, for driving said transmission line;
a second buffer circuit including:
a buffer, receiving a second logic signal that is in a predetermined logical relationship to said first logic signal, as an input, said buffer having an output thereof connected in common with an output of said first buffer circuit;
a first switch connected across said buffer and a first power supply and controlled to be turned on or off based on an input signal; and
a second switch connected across said buffer and a second power supply and controlled to be on or off based on a signal supplied to a control terminal thereof, in association operatively with said first switch; and
first and second capacitors, provided as said at least one capacitor, said first capacitor being connected across an input terminal of said first buffer circuit and a connection node between said buffer and said first switch in said second buffer circuit, said second capacitor being connected across an input terminal of said first buffer circuit and a connection node between said buffer and said second switch in said second buffer circuit.

6. The output buffer circuit according to claim 1, wherein said capacitor is a capacitor between interconnections.

7. The output buffer circuit according to claim 6, wherein the capacitance value of the capacitor is made selectable by changing over a distance between interconnections prescribing said capacitor between interconnections.

8. A semiconductor device including the output buffer circuit as set forth in claim 1 as an output buffer circuit.

9. An output buffer circuit having a function of pre-emphasis and being adapted to transmit a logic signal to a transmission line, comprising:
a first buffer circuit, receiving a first logic signal, as an input, for driving said transmission line;
a second buffer circuit including:
a buffer receiving a second logic signal that is in a predetermined logical relationship to said first logic signal, as an input, said buffer having an output thereof connected in common with an output of said first buffer circuit; and
at least one switch connected across said buffer and a power supply and controlled to be turned on or off based on a signal supplied to a control terminal thereof; and
at least one capacitor connected across an input terminal of said first buffer circuit and a connection node between said buffer and said switch in said second buffer circuit.

10. An output buffer circuit having a function of pre-emphasis and being adapted to transmit a logic signal to a transmission line, comprising:

a first buffer circuit, receiving a first logic signal as an input, for driving said transmission line;

a second buffer circuit including:

a buffer, receiving a second logic signal that is in a predetermined logical relationship to said first logic signal, as an input, said buffer having an output thereof connected in common with an output of said first buffer circuit; and at least one switch connected across said buffer and a power supply and controlled to be turned on or off based on a signal supplied to a control terminal thereof; and a capacitor connected across said control terminal of said switch and a connection node between said buffer and said switch.

* * * * *